(12) United States Patent
Caswell et al.

(10) Patent No.: US 8,668,341 B2
(45) Date of Patent: Mar. 11, 2014

(54) PRISMATIC RETROREFLECTIVE ARTICLE BEARING A GRAPHIC AND METHOD OF MAKING SAME

(75) Inventors: Warren P. Caswell, Cottage Grove, MN (US); Chester A. Bacon, Jr., Oakdale, MN (US); Stewart H. Corn, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 450 days.

(21) Appl. No.: 13/130,833

(22) PCT Filed: Nov. 20, 2009

(86) PCT No.: PCT/US2009/065228
§ 371 (c)(1),
(2), (4) Date: May 24, 2011

(87) PCT Pub. No.: WO2010/077474
PCT Pub. Date: Jul. 8, 2010

(65) Prior Publication Data
US 2011/0228393 A1  Sep. 22, 2011

Related U.S. Application Data

(60) Provisional application No. 61/120,689, filed on Dec. 8, 2008.

(51) Int. Cl.
*G02B 5/124* (2006.01)
(52) U.S. Cl.
USPC ............................ 359/530; 359/529
(58) Field of Classification Search
USPC .................................. 359/529–530
See application file for complete search history.

(56) References Cited

U.S. PATENT DOCUMENTS

| 3,684,348 A | 8/1972 | Rowland |
| 4,025,159 A | 5/1977 | McGrath |

(Continued)

FOREIGN PATENT DOCUMENTS

| CN | 1292880 | 4/2001 |
| CN | 1350935 | 5/2002 |

(Continued)

OTHER PUBLICATIONS

"American National Standard for High-Visibility Safety Apparel and Headwear," ANSI/ISEA, 107-2004, 42 pages, 2004.

(Continued)

*Primary Examiner* — James Phan
(74) *Attorney, Agent, or Firm* — Nicole J. Einerson

(57) ABSTRACT

A prismatic retroreflective article bearing a graphic and a method of making the same. The prismatic retroreflective article can include an optical layer including a front surface and a rear structured surface defined at least partially by internally reflecting cube-corner optical elements. The rear structured surface can be infused with a graphic, such that the prismatic retroreflective article retroreflects the graphic when viewed from the front surface of the optical layer. The method can include providing a graphic donor sheet, coupling the graphic donor sheet to the prismatic retroreflective article to form a composite, and applying heat and pressure to the composite to transfer at least a portion of the sublimation colorant from the graphic donor sheet to the rear structured surface of the optical layer.

22 Claims, 2 Drawing Sheets

(56) References Cited

U.S. PATENT DOCUMENTS

| | | |
|---|---|---|
| 4,153,412 A | 5/1979 | Bailey |
| 4,588,258 A | 5/1986 | Hoopman |
| 4,767,659 A | 8/1988 | Bailey |
| 4,775,219 A | 10/1988 | Appeldorn |
| 4,983,436 A | 1/1991 | Bailey |
| 5,064,272 A | 11/1991 | Bailey |
| 5,066,098 A | 11/1991 | Kult |
| 5,069,964 A | 12/1991 | Tolliver |
| 5,080,463 A | 1/1992 | Faykish |
| 5,085,918 A | 2/1992 | Rajan |
| 5,138,488 A | 8/1992 | Szczech |
| 5,169,707 A | 12/1992 | Faykish |
| 5,213,872 A | 5/1993 | Pricone |
| 5,229,882 A | 7/1993 | Rowland |
| 5,262,225 A | 11/1993 | Wilson |
| 5,272,562 A * | 12/1993 | Coderre ............ 359/529 |
| 5,344,705 A | 9/1994 | Olsen |
| 5,378,575 A | 1/1995 | Rajan |
| 5,387,458 A | 2/1995 | Pavelka |
| 5,393,590 A | 2/1995 | Caspari |
| 5,450,235 A | 9/1995 | Smith |
| 5,605,761 A | 2/1997 | Burns |
| 5,614,286 A | 3/1997 | Bacon, Jr. |
| 5,656,360 A | 8/1997 | Faykish |
| 5,672,381 A | 9/1997 | Rajan |
| 5,691,846 A | 11/1997 | Benson, Jr. |
| 5,698,364 A | 12/1997 | Janssens |
| 5,706,133 A | 1/1998 | Orensteen |
| 5,770,124 A | 6/1998 | Marecki |
| 5,910,812 A | 6/1999 | Yamamoto |
| 5,916,399 A | 6/1999 | Olsen |
| 5,977,263 A | 11/1999 | Phillips |
| 5,988,820 A | 11/1999 | Huang |
| 6,024,455 A | 2/2000 | O'Neill |
| 6,054,208 A | 4/2000 | Rega |
| 6,100,217 A | 8/2000 | Nagaoka |
| 6,119,751 A | 9/2000 | Nilsen |
| 6,120,636 A | 9/2000 | Nilsen |
| 6,157,486 A | 12/2000 | Benson, Jr. |
| 6,172,810 B1 | 1/2001 | Fleming |
| 6,174,607 B1 | 1/2001 | Sugita |
| 6,200,666 B1 | 3/2001 | Christian |
| 6,224,219 B1 | 5/2001 | Fleming |
| 6,243,201 B1 | 6/2001 | Fleming |
| 6,350,035 B1 | 2/2002 | Smith |
| 6,506,480 B2 | 1/2003 | Liu |
| 6,514,655 B2 | 2/2003 | Bastiaens |
| 6,534,128 B1 | 3/2003 | Carlson |
| 6,534,158 B2 | 3/2003 | Huang |
| 6,568,817 B1 | 5/2003 | Mimura |
| 6,660,390 B2 | 12/2003 | Bacon, Jr. |
| 6,677,028 B1 | 1/2004 | Lasch |
| 6,677,045 B1 | 1/2004 | Meisenburg et al. |
| 6,720,042 B2 | 4/2004 | Ylitalo |
| 6,723,433 B2 | 4/2004 | Bacon, Jr. |
| 6,726,982 B2 | 4/2004 | Christian |
| 6,790,578 B1 | 9/2004 | Rajan |
| 6,953,624 B2 | 10/2005 | Bacon, Jr. |
| 7,185,993 B2 | 3/2007 | Smith |
| 7,547,105 B2 | 6/2009 | Bacon, Jr. |
| 7,648,744 B2 | 1/2010 | Kuo |
| 2003/0211299 A1 | 11/2003 | Rajan |
| 2004/0006152 A1 | 1/2004 | Weikard |
| 2004/0029044 A1 | 2/2004 | Severance |
| 2007/0014011 A1 | 1/2007 | Smith |

FOREIGN PATENT DOCUMENTS

| | | |
|---|---|---|
| CN | 1993235 | 7/2007 |
| EP | 0615788 | 9/1994 |
| EP | 1062531 | 5/2003 |
| JP | 2004-036161 | 2/2004 |
| JP | 2004-037831 | 2/2004 |
| JP | 2004-045487 | 2/2004 |
| JP | 2004-136541 | 5/2004 |
| KR | 10-1999-0060133 | 7/1999 |
| WO | WO 99/46616 | 9/1999 |
| WO | WO 2007/124217 | 11/2007 |
| WO | WO 2010/077475 | 7/2010 |

OTHER PUBLICATIONS

European Standard EN471, High-visibility warning clothing for professional use—Test methods and requirements, 30 pages, 2003.
"ASTM E810-03 Standard Test Method for Coefficient of Retroreflection of Retroreflective Sheeting Utilizing the Coplanar Geometry", ASTM international, West Conshohocken, PA., Approved Feb. 10, 2003, Published Apr. 2003, 8 pages.
"CIE 54.2 Retroreflection: Definition and Measurement", International Commission on Illumination, Published 2001, 62 pages.
International Standard ISO/FDIS 6330 "Textiles-Domestic Washing and Drying Procedures for Textile Testing" (2000), 18 pages.
International Search Report PCT/US2009/065228 Jul. 1, 2010, 4 pgs.
3M Material Safety Data Sheet 3M ™ Thermal Transfer Ribbon TTR1300 Series Sep. 20, 2007, 7 pages.
200980153674.2 State Intellectual Property Office of P.R.C. Search Report; Sep. 19, 2012; 2 pages.

* cited by examiner

PRISMATIC RETROREFLECTIVE ARTICLE BEARING A GRAPHIC AND METHOD OF MAKING SAME

CROSS REFERENCE TO RELATED APPLICATIONS

This is a national stage filing under 35 U.S.C. 371 of PCT/US2009/065228, filed Nov. 20, 2009, which claims priority to U.S. Provisional Application No. 61/120,689, filed Dec. 8, 2008, the disclosure of which is incorporated by reference in its entirety herein.

FIELD

The present disclosure generally relates to prismatic retroreflective articles that bear a graphic to provide the retroreflective article with a desired color and/or image, and particularly, to retroreflective articles that include an optical layer bearing a graphic.

BACKGROUND

Retroreflective articles can be used to provide conspicuity to a variety of rigid and flexible materials. Some retroreflective articles can provide daytime and nighttime visibility to the materials to which they are applied for enhanced conspicuity under any lighting condition. Some retroreflective articles can include a color and/or graphic that is visible at least under daytime lighting conditions.

Graphics can be used to deliver a desired visual effect, and can be used to customize retroreflective articles. In some existing systems, such customization occurs by applying a graphic to an outwardly-facing surface of the retroreflective article, so that a color and/or image is visible. Such customization can help identify the source of a good or service, and/or can include a text graphic with informational or advisory language.

SUMMARY

One aspect of the present disclosure provides a prismatic retroreflective article bearing a graphic. The prismatic retroreflective article can include an optical layer including internally reflecting cube-corner optical elements. The optical layer can have a front surface and a rear structured surface opposite the front surface, the rear structured surface defined at least partially by the cube-corner optical elements. The rear structured surface can be infused with a graphic, such that the prismatic retroreflective article retroreflects the graphic when viewed from the front surface of the optical layer.

Another aspect of the present disclosure provides a method of making a prismatic retroreflective article bearing a graphic. The method can include providing a graphic donor sheet comprising a first surface comprising a sublimation colorant, and providing a prismatic retroreflective article comprising an optical layer comprising a rear structured surface at least partially defined by internally-reflecting cube-corner optical elements. The method can further include coupling the graphic donor sheet to the prismatic retroreflective article to form a composite, such that the first surface of the graphic donor sheet is coupled to the rear structured surface of the optical layer. The method can further include applying heat and pressure to the composite to transfer at least a portion of the sublimation colorant from the graphic donor sheet to the rear structured surface of the optical layer, such that the optical layer is infused with a graphic.

Other features and aspects of the present disclosure will become apparent by consideration of the detailed description and accompanying drawings.

DETAILED DESCRIPTION

Figure 1:
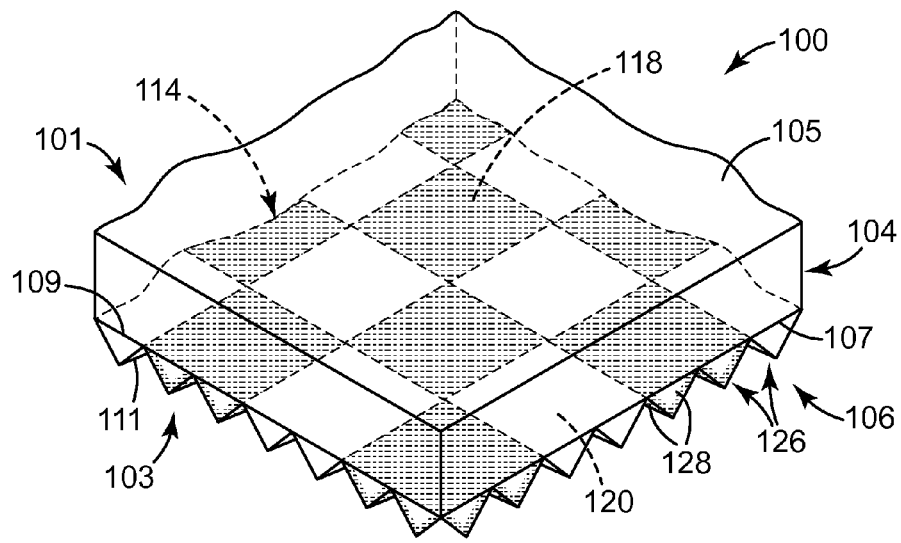
FIG. 1 is a schematic perspective view of a prismatic retroreflective article according to one embodiment of the present disclosure, the prismatic retroreflective article bearing a graphic.

Before any embodiments of the present disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected" and "coupled," and variations thereof, are used broadly and encompass both direct and indirect connections and couplings. Further, "connected" and "coupled" are not restricted to physical or mechanical connections or couplings. It is to be understood that other embodiments may be utilized, and structural or logical changes may be made without departing from the scope of the present disclosure. Furthermore, terms such as "front," "rear," and the like are only used to describe elements as they relate to one another, but are in no way meant to recite specific orientations of the apparatus, to indicate or imply necessary or required orientations of the apparatus, or to specify how the invention described herein will be used, mounted, displayed, or positioned in use.

The present disclosure generally relates to prismatic retroreflective articles that bear a graphic to provide the retroreflective article with a desired color and/or image. The present disclosure further relates to retroreflective articles comprising an optical layer that bears a graphic.

Retroreflective articles for a variety of uses and applications can be customized to a user's specifications to bear a desired color, image, trademark, logo, or the like. Customizing the optical layer itself of the retroreflective article can allow the retroreflective article to retroreflect the graphic, such that the graphic is visible in daytime and nighttime lighting conditions, and can also provide a "buried" graphic, such that the graphic is protected without requiring additional protective overlay materials. Previous attempts to customize an optical layer of the retroreflective article included (1) attempting to apply a graphic to a front surface of the optical layer (e.g., the surface opposite the optical elements), (2) attempting to apply a graphic to the optical elements themselves, or both.

There are potential problems associated with the first attempt. In some cases where a graphic is applied to the front surface of the optical layer, additional layers may be required to be disposed on top of the graphic to protect the graphic from environmental conditions. In addition, such placement of a graphic (i.e., between layers of a retroreflective article) may minimize the customization available to end users and may require a supplier of retroreflective articles to manufacture a wide variety of products to meet specific customer needs.

Potential problems associated with the second attempt include (1) poor optical/retroreflective performance due to distortion of the optical elements that may occur during the graphic application process, (2) poor optical/retroreflective performance due to the breakdown of an air interface at the back of the optical elements, or (3) a combination thereof. Some existing printing methods, whether contact or non-contact, deposit ink, or a similar material, that has some flow or wetting action on the surface to which is it applied, until the ink is dried or cured. Such a deposit or wetting action can distort and destroy the necessary topography of optical elements (e.g., microreplicated elements). For example, in embodiments employing cube-corner optical elements, the optical layer includes facets, apices, and valleys in which print media (e.g., ink) can collect to various thicknesses, rather than uniformly following the profile of the optical elements. Such collection of print media can distort and/or destroy the retroreflectivity of the retroreflective article.

However, customization of an optical layer can provide some benefits. The present inventors have discovered that by allowing the optical elements of an optical layer of the retroreflective article to be customized with a graphic, a supplier can produce one retroreflective article to meet the needs of a variety of customers, and customers can customize the retroreflective article to meet their specifications.

In addition, in some cases, retroreflective articles can include a front surface topography that makes it difficult to obtain quality, reproducible colors and/or images by standard printing or coating methods on the front surface. By customizing the optical layer instead of the front surface of a retroreflective article, users can avoid the color/image design limitations, cost, difficulty, waste and/or potentially low quality product associated with printing on a relatively rough substrate, or a substrate with surface topography.

A "retroreflective" article reflects incident incoming light in a direction generally parallel to the incident direction, or nearly so, such that an observer or detector at or near the light source can see or detect the reflected light. The word "light" refers generally to visible radiation in the electromagnetic spectrum.

The term "prismatic," when used with respect to retroreflective articles, generally refers to an array of cube-corner optical elements. "Cube-corner optical elements" include generally trihedral structures that have three approximately mutually perpendicular lateral faces meeting in a single corner (i.e., a cube-corner) to retroreflect incoming light. A "prismatic retroreflective article" generally includes a structured rear surface (i.e., a surface opposite the surface through which incoming light is directed) that includes a plurality of geometric structures, some or all of which include three reflective faces configured as a cube-corner optical element. Illustrative examples of cube-corner-based retroreflective articles are disclosed in U.S. Pat. No. 5,138,488 (Szczech); U.S. Pat. No. 5,387,458 (Pavelka); U.S. Pat. No. 5,450,235 (Smith); U.S. Pat. No. 5,605,761 (Burns); U.S. Pat. No. 5,614,286 (Bacon) and U.S. Pat. No. 5,691,846 (Benson, Jr.), each of which is incorporated herein by reference.

The word "polymer" includes homopolymers and copolymers. The term "copolymer" includes both random and block polymers.

The term "transparent" is used according to its ordinary meaning. In some embodiments, it is used to refer to a material or layer that is able to transmit at least about 50 percent of the intensity of the light incident upon it at a given wavelength, measured along a normal axis. In some embodiments, the materials or layers (e.g., polymers) that are used in the retroreflective sheeting of the present disclosure have a light transmissibility of greater than about 70 percent, in some embodiments, greater than about 80 percent, and in some embodiments, greater than about 90 percent.

The phrase "internally reflecting," when used with respect to a cube-corner optical element, is used broadly herein to refer to an element that reflects incident light back through the element either due to an air interface on the cube-corner element rear surface, or due to a reflective coating (e.g., a metalized coating, a coating containing a reflective pigment or a stack of coating layers having a refractive index mismatch) on the cube-corner element rear surface.

Figure 2:
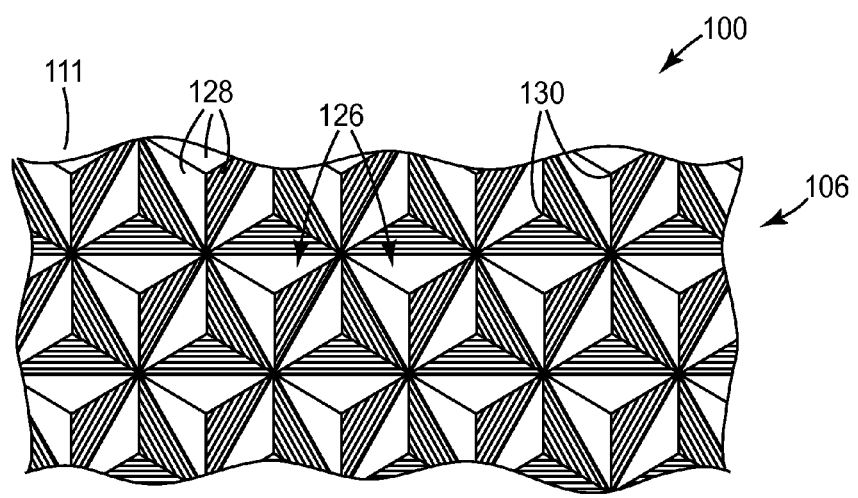
FIG. 2 is a plan view of the rear structured surface of the prismatic retroreflective article of FIG. 1, with the graphic removed for clarity.

FIGS. 1-2 illustrate a retroreflective article 100 (also sometimes referred to as "retroreflective sheeting") according to one embodiment of the present disclosure, and particularly, a prismatic retroreflective article 100. The retroreflective article 100 comprises a transparent body portion 104, and an optical layer 106. The retroreflective article 100 has a front 101 and a rear 103, each layer making up the prismatic retroreflective article 100 having a respective front surface and rear surface. For example, the body portion 104 has a front surface 105 and a rear surface 107, and the optical layer 106 has a front surface 109 coupled to the rear surface 107 of the body portion 104, and a rear surface 111. The polymeric materials that compose the retroreflective article 100 can be light transmissible, and in some cases, transparent.

As shown in FIG. 1, the optical layer 106 includes a graphic 114, such that the graphic 114 is buried with respect to the front 101 of the retroreflective article 100. Particularly, the graphic 114 is buried with respect to the front surface 109 of the optical layer 106, as well as with respect to the body portion 104.

The coefficient of retroreflection ($R_A$), or retroreflectivity, of the retroreflective article 100 can vary depending on the desired properties of the finished article. In some embodiments, the coefficient of retroreflection of the retroreflective article 100 is sufficient to pass the ANSI/ISEA 107-2004 standard and the EN471 specification at 0 degrees and 90 degrees orientation angles. In some embodiments, the coefficient of retroreflection ranges from about 5 candelas per lux per square meter (cd/lux/m$^2$), for colored retroreflective layers, to about 1500 cd/lux/m$^2$, when measured at 0.2 degree observation angle and +5 degree (or −4.0 degree) entrance angle according to ASTM E-810 test method or CIE 54.2; 2001 test method for coefficient of retroreflection of retroreflective sheeting. In some embodiments, the coefficient of retroreflection of the retroreflective article 100 is at least about 330 cd/lux/m$^2$, in some embodiments, at least about 500 cd/lux/m$^2$, and in some embodiments, at least about 700 cd/lux/m$^2$, as measured according to ASTM E-810 test method or CIE 54.2; 2001 test method at 0.2 degree observation angle and +5 degree (or −4.0 degree) entrance angle.

As described above, the optical layer 106 includes a graphic 114 that is buried with respect to the front 101 of the retroreflective article 100, and is also buried with respect to the front surface 109 of the optical layer 106. By employing a buried graphic 114, the graphic 114 can be protected (e.g., by the front portion of the optical layer 106 or other layers of the retroreflective article 100), such that the graphic 114 is provided with one or more of stain resistance, low coefficient of friction, chemical resistance, weather resistance, toughness, and abrasion resistance.

The graphic 114 can be a continuous color or the graphic 114 can include an image, pattern or design, which is sometimes referred to herein as being "imaged." In some embodiments, the graphic 114 is colored and imaged, such that the graphic 114 includes a design, logo, pattern, or the like, and also includes one or more colors. The term "graphic" is used herein to refer to a color, an image, and any combination thereof.

With reference to FIG. 1, the graphic 114 includes a checkered pattern and has imaged portions (e.g., checkers) 118 and non-imaged portions (e.g., spaces between the checkers) 120. The checkered pattern is shown merely by example and for simplicity. In addition, by way of example only and for simplicity, the imaged portions 118 (e.g., checkers) of the checkered pattern in FIG. 1 are shown as being the same color. However, it should be understood that even a variety of checkered patterns can be employed, where each checker in the checkered pattern is formed of a different color, resolution, color density, opacity, color gradient, or combination thereof. Furthermore, the graphic 114 is not limited to the exemplary checkered pattern shown in FIG. 1, but rather a variety of designs, logos, patterns, text, and combinations thereof, of any number or variety of colors, resolutions, color densities, opacities, color gradients, and combinations thereof, can be employed in the graphic 114.

The body portion 104 is shown in FIG. 1 by way of example only, however, it should be understood that the body portion 104 can be an optional component of the retroreflective article 100. The body portion 104, if employed, can be formed of a flexible, transparent polymeric material having an elastic modulus of less than about $13 \times 10^8$ Pa (1.3 GPa), in some embodiments, less than about $10 \times 10^8$ Pa, in some embodiments, less than about $7 \times 10^8$ Pa, in some embodiments, less than about $5 \times 10^8$ Pa, and in some embodiments, less than about $3 \times 10^8$ Pa. The body portion 104 generally functions to protect the retroreflective article 100 from environmental elements and/or to provide mechanical integrity to the retroreflective article 100.

A flexible body portion 104 allows the retroreflective article 100 to be used in a variety of applications that require a certain degree of flexibility and/or conformability, including, but not limited to, one or more of a trailer tarpaulin; a roll-up sign; high visibility apparel and clothing such as shirts, pants, caps, coveralls, and vests; temporary traffic signage and delineation; and marine applications, such as personal flotation devices and life rafts.

The body portion 104 can be formed of a variety of polymeric materials, including, but not limited to, one or more of fluorinated polymers, ethylene copolymers, ionomeric ethylene copolymers, low density polyethylenes, plasticized vinyl halide polymers such as plasticized poly(vinylchloride), polyethylene copolymers, aliphatic and aromatic polyurethanes, methyl methacrylate butyl methacrylate coplymers, polyvinylbutyral, copolyesters, and combinations thereof.

As shown in FIG. 2, the optical layer 106 includes a rear surface 111 that is structured and formed of a plurality of cube-corner optical elements 126. Each cube-corner optical element 126 is defined by three open-air exposed planar facets 128 and an apex 130 arranged to form a trihedral pyramidal prism. The cube-corner optical elements 126 are disposed as matched pairs in an ordered array on one side of the retroreflective sheeting 100 (and are shown to protrude out of the page when viewed from the perspective of FIG. 2). The planar facets 128 may for example be substantially perpendicular to one another (as in the corner of a room). The angle between the facets 128 of adjacent cube corner optical elements can be substantially the same for each cube-corner element 126 in the array and can be about 90°. The angle between adjacent cube corner optical elements 126 may however deviate from 90° as described, for example, in U.S. Pat. No. 4,775,219. Although the apex 130 of each cube-corner optical element 126 may be vertically aligned with the center of the cube-corner optical element base as described, for example, in U.S. Pat. No. 3,684,348, the apex 130 also may be canted as described, for example, in U.S. Pat. No. 4,588,258. Thus, the present disclosure is not limited to any particular cube-corner geometry, and any of the geometries now known or hereafter developed may be employed.

In use, the retroreflective article 100 is arranged with its front 101 being disposed generally toward anticipated locations of intended observers and sources of incident light. Light can enter the retroreflective article 100 through the front 101, can then pass through the body portion 104, strike the planar facets 128 of the cube-corner optical elements 126, and return in the direction generally parallel to (i.e., toward) that which it came, such that the cube-corner optical elements 126 are internally-reflecting. In some embodiments, for example where the retroreflective article 100 may be exposed to moisture, the cube-corner optical elements 126 can be encapsulated with a seal film (not shown). Such sealing methods can include ultrasonic, radio frequency, and/or thermal bonding methods. In some embodiments, the rear surface 111 of the optical layer 106 can include a specularly reflective material (e.g., a metal layer), and in some embodiments, the cube-corner optical elements 126 can be formed of, or coated with, a more hydrophobic/oleophilic material to protect the rear structured surface 111. The specularly reflective material, if employed, can be applied to the rear surface 111 of the optical layer 106 in a variety of ways, including, but not limited to vapor coating, chemical deposition, and combinations thereof. In embodiments employing a specularly reflective layer, the graphic 114 can be applied to the rear surface 111 of the optical layer 106 before or after the specularly reflective material is applied. Examples 5-7 below demonstrate applying a graphic to the rear structured surface of an optical layer after a specularly reflective material has been applied to the rear structure surface. As shown in Examples 5-7, in some embodiments, the sublimation colorants can be sublimated onto a rear structured surface bearing a specularly reflective material, and the sublimation colorants can move past the specularly reflective material during the sublimation process, such that at least a portion of the infused graphic can be positioned in front of the specularly reflective material in the resulting optical layer.

In some embodiments, the cube-corner optical elements 126 are formed of a transparent polymeric material having an elastic modulus of greater than about $14 \times 10^8$ Pa, in some embodiments, greater than about $16 \times 10^8$ Pa, in some embodiments, greater than about $18 \times 10^8$ Pa, and in some embodiments, greater than about $20 \times 10^8$ Pa. Thus, in some embodiments, the cube-corner elements 126 can be formed of a polymeric material that has an elastic modulus that is at least about $1 \times 10^8$ Pa greater than the polymeric material of the body portion 104, and may be at least about $5 \times 10^8$, about $9 \times 10^8$, about $11 \times 10^8$, about $13 \times 10^8$, or even about $17 \times 10^8$ Pa greater than the polymeric material of the body portion 104.

The optical layer 106 can be formed of a variety of polymeric materials, including, but not limited to, one or more of acrylic polymers such as poly(methyl methacrylate); polycarbonates; cellulosics such as cellulose acetate, cellulose (acetate-co-butyrate), cellulose nitrate; epoxies; polyesters such as poly(butylene terephthalate), poly(ethylene terephthalate); fluoropolymers such as poly(chlorofluoroethylene), poly(vinylidene fluoride); polyvinyl chloride; polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene) and poly(styrene) copolymers such as poly(styrene-co-acrylonitrile), poly(styrene-co-acrylonitrile-co-butadiene); polysulfone; silicone modified polymers (i.e., polymers that contain a small weight percent (e.g., less than 10 weight percent) of silicone) such as silicone polyamide and silicone polycarbonate; fluorine modified polymers such as perfluoropoly(ethyleneterephthalate); and combinations of the above polymers, such as a poly(ester)/poly(carbonate) blend, a fluoropolymer/acrylic polymer blend, urethane acrylates, epoxy acrylates, halogenated epoxy acrylates, and the like.

Additional materials suitable for forming the optical layer 106 are reactive resin systems capable of being cross-linked by a free radical polymerization mechanism by exposure to actinic radiation, such as electron beam, ultraviolet light, or visible light. Additionally, these materials may be polymerized by thermal means with the addition of a thermal initiator such as benzoyl peroxide. Radiation-initiated cationically polymerizable resins also may be used.

In some embodiments, the body portion 104 and the optical layer 106 are integrally formed of the same material into a cube-corner sheeting having a generally planar front surface 105 and an array of cube corner optical elements 126 protruding from its rear surface (i.e., forming the rear structured surface 111). Such cube-corner sheeting can be formed by casting, thermal embossing, extrusion, injection molding, or a combination thereof. In some embodiments, as shown in FIG. 1, and described above, the body portion 104 and the optical layer 106 are formed of different materials (e.g., to achieve a desired level of flexibility without diminishing retroreflectivity). In such embodiments, by way of example only, the body portion 104 can be extruded, and the optical layer 106 can be cast and cured to the body portion 104.

In some applications, the retroreflective sheetings are used on flat inflexible articles, for example, road signs and barricades. However, in some applications, the sheetings are used on irregular or flexible surfaces. For example, a retroreflective sheeting may be adhered to the side of a truck trailer, which may require the sheeting to pass over corrugations and/or protruding rivets, or the sheeting may be adhered to a flexible substrate such as a road worker's safety vest. In situations where the underlying surface is irregular or flexible, the retroreflective sheeting can possess good conformability and flexibility (e.g., by employing a relatively flexible body portion 104) but, in some embodiments, not at the expense of sacrificing retroreflective performance (e.g., by employing a relatively rigid optical layer 106 to maintain optical properties).

Whether integrally formed with the body portion 104 or formed separately, the optical layer 106 can include a multitude of interconnected, cube-corner optical elements (e.g., the optical layer 106 can include a land area), or the optical layer 106 can include a plurality of discrete or independent cube-corner optical elements 126, as shown in the embodiment illustrated in FIGS. 1-2. The term "discrete" as used with respect to cube-corner optical elements 126 refers to each element being detached or independent from an adjacent cube-corner optical element 126. The use of discrete cube-corner optical elements 126 can increase the flexibility of the retroreflective article 100 because each cube-corner optical element 126 can move independently of the other cube-corner optical elements 126. Discrete cube-corner optical elements 126, such as those shown in FIGS. 1-2, can be prepared, for example, by casting directly onto a film (e.g., the body portion 104), such as described in U.S. Pat. No. 5,691,846, which is incorporated herein by reference.

Retroreflective articles employing a body portion formed of a low elastic modulus polymeric material and cube-corner elements formed of a higher elastic modulus polymeric material and methods of making such articles are described in greater detail in US Patent Application Publication No. 2007/0014011 and U.S. Pat. Nos. 7,185,993, 6,350,035, 5,988,820, 5,691,846, and 5,450,235, the disclosures of which are incorporated herein by reference.

As shown in FIG. 1, the graphic 114 can be applied to the rear structured surface 111 of the optical layer 106. However, the graphic 114 is applied to the rear structure surface 111 of the optical layer 106 in a way that does not impede the desired optical properties of the cube-corner optical elements 126, and which does not substantially disrupt the desired retroreflectivity of the cube-corner optical elements 126, except in areas where it is desired as a part of the graphic 114.

The graphic 114 can be applied to the rear surface of the optical layer 106 in a variety of ways, such that the graphic 114 is infused in the optical layer 106. Examples of methods that can be employed to apply the graphic 114 to the optical layer 106 can include, but are not limited to, sublimation, dye sublimation printing, and combinations thereof. An exemplary sublimation process is described in greater detail below with reference to FIG. 4.

A variety of materials can be employed as a graphic material, including, but not limited to, sublimation colorants, such as sublimation dyes, including, but not limited to, azo dyes (e.g., p-aminoazobenzene; p-nitroazobenzene; 4-N,N-diethylaminoazobenzene; 4-N,N-dimethylaminoazobenzene; 4'-nitro-4-N,N-diethylaminoazobenzene; 4-(4'-methyl-2'-nitrophenylazo)-3-methyl-5-pyrazalone; etc.); anthraquinone dyes (e.g., 1-aminoanthraquinone; 1-amino-4-hydroxyanthraquinone; 1,4-dimethylaminoanthraquinone; 1-hydroxy-3-phenoxy-4-amino anthraquinone; the butyl or propyl ester of 1,4-diaminoanthraquinone 2-carboxylic acid; etc.); quinoline dyes (e.g., hydroxyquinophthalone, 2-(3-hydroxy-2-quinolyl)-1H-indene-1,3(2H)-dione (CAS #7576-65-0); any of the dyes described in U.S. Pat. No. 4,153,412 (Bailey), U.S. Pat. No. 5,698,364 (Janssens), and U.S. Pat. No. 5,910,812 (Yamamoto), each of which is incorporated herein by reference; and combinations thereof.

Examples of suitable sublimation colorants or dyes can include, but are not limited to, various water-based and/or oil-based sublimation inks (e.g., available from Hilord Chemical Corporation, Hauppauge, N.Y.), electrostatic sublimation dyes, gravure sublimation dyes (e.g., gravure sublimation dyes available from Transprint USA, Harrisonburg, Va., which are supplied already applied to transfer printing paper, e.g., polyester inks, low energy inks, etc.), and combinations thereof. Examples of suitable sublimation dye printers can include, but are not limited to, ink jet printers made by Mimaki Engineering Company, Ltd. (Japan), Mutoh (Japan), Roland DG Corporation (Japan), Canon (Japan), Hewlett-Packard (Palo Alto, Calif.) and Océ N.V. (Netherlands).

Figure 3:
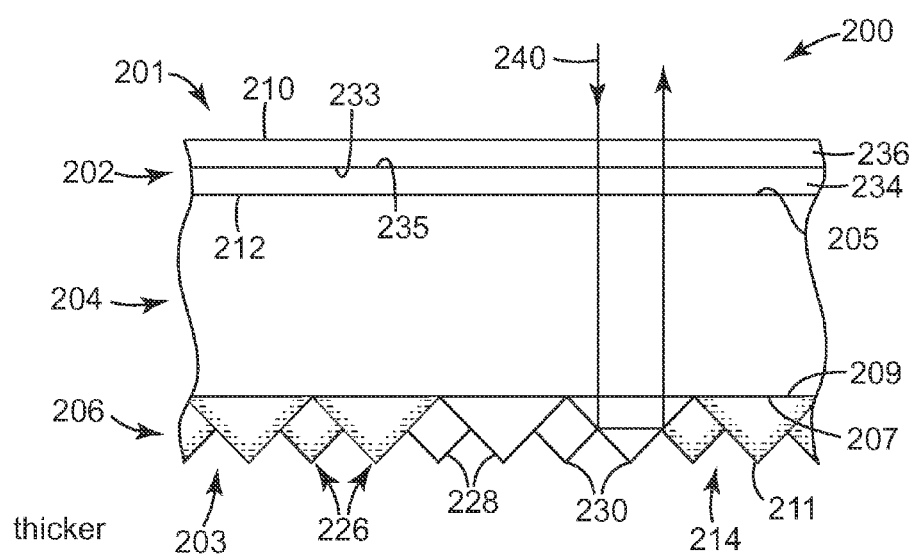
FIG. 3 is a schematic side view of a retroreflective article according to another embodiment of the present disclosure.

FIG. 3 illustrates a prismatic retroreflective article 200 according to another embodiment of the present disclosure, wherein like numerals represent like elements. The retroreflective article 200 shares many of the same elements and features described above with reference to the illustrated embodiment of FIGS. 1-2. Accordingly, elements and features corresponding to elements and features in the illustrated embodiment of FIGS. 1-2 are provided with the same reference numerals in the 200 series. Reference is made to the description above accompanying FIGS. 1-2 for a more complete description of the features and elements (and alternatives to such features and elements) of the embodiments illustrated in FIG. 3.

As shown in FIG. 3, the retroreflective article 200 comprises an overlay 202, a body portion 204, and an optical layer 206. The retroreflective article 200 has a front 201 and a rear 203, each layer making up the prismatic retroreflective article 200 having a respective front surface and rear surface. For example, the overlay 202 includes a front surface 210 and a rear surface 212 adapted to be coupled to a front surface 205 of the body portion 204. The body portion 204 further includes a rear surface 207, and the optical layer 206 has a front surface 209 adapted to be coupled to the rear surface 207 of the body portion 204, and a rear surface 211.

The optical layer 206 includes a graphic 214, such that the graphic 214 is buried with respect to the front 201 of the retroreflective article 200. Particularly, the graphic 214 is buried with respect to the front surface 209 of the optical layer 206, the front surface 205 of the body portion 204, and the front surface 210 of the overlay 202.

In use, the retroreflective article 200 is arranged with its front 201 being disposed generally toward anticipated locations of intended observers and sources of incident light. As shown by arrow 240 in FIG. 3, light enters the retroreflective article 200 through the front 201. The light then passes through the overlay 202, the body portion 204, and optionally, at least a portion of the graphic 214, depending on whether the graphic 214 is continuous or imaged. The light then strikes the planar facets 228 of the cube-corner optical elements 226, and returns in the direction generally parallel to (i.e., toward) that which it came, such that the cube-corner optical elements 226 are internally-reflecting.

FIG. 3 shows the graphic 214 being uniformly infused into the rear surface 211 of the optical layer 206 (and particularly, near the rear surface 211 of the cube-corner optical elements 226). However, it should be understood that FIG. 3 is a schematic representation only and is only meant to be illustrative and not limiting. It should be further understood that depending on the type of graphic material (e.g., sublimation dye) used, the material makeup of the optical layer 206, and the conditions under which graphic 214 is applied to the optical layer 206, a variety of results may be possible. For example, the graphic material may form a thin layer adjacent the rear surface 211, or the graphic material may be present in more of a gradient, where the concentration of graphic material is greatest toward the rear surface 211 of the optical layer 206 and least toward the front surface 209 of the optical layer 206, or at least some of the graphic material may migrate further, for example, into the body portion 204 or the overlay 202.

Some embodiments, such as the retroreflective article 100 shown in FIGS. 1 and 2, doe not include any overlay; however, in some embodiments, as shown in FIG. 3, the overlay 202 can be employed to provide one or more of stain resistance, low coefficient of friction, chemical resistance, weather resistance, toughness, and abrasion resistance to the retroreflective article 200. In some embodiments, the overlay 202 can include a single layer, and in some embodiments, the overlay 202 can include more than one layer. For example, as shown in FIG. 3, the overlay 202 includes a bonding layer 234 and a barrier layer 236. In some embodiments, the overlay 202 can include just the bonding layer 234 or just the barrier layer 236.

In the embodiment illustrated in FIG. 3, the barrier layer 236 includes a front surface 210 (which corresponds with the front surface 210 of the overlay 202) and a rear surface 233. The bonding layer 234 includes a front surface 235 that is coupled to the rear surface 233 of the barrier layer 236, a and a rear surface 212 (which corresponds to the rear surface 212 of the overlay 202) that is at least partially formed of a bonding material. The rear surface 212 of the bonding layer 234 is also adapted to be coupled to a substrate (e.g., the front surface 205 of the body portion 204 of the retroreflective article 200, as shown in FIG. 3, or the front surface 209 of the optical layer 206 in embodiments that do not employ the body portion 204).

The barrier layer 236 can be employed in the overlay 202 and the retroreflective article 200 to provide a flexible, printable and stain resistant layer to the overlay 202, and ultimately to the underlying layers of the retroreflective article 200. The barrier layer 236, if employed, can be formed of a variety of thermoset or thermoresistive materials, which may be rigid or flexible to meet or exceed the in-use requirements of the retroreflective article 200. Examples of suitable materials for the barrier layer 236 include, but are not limited to, cross-linked polyurethane chemistries (e.g., polyurethanes and polyurethane acrylates), polyacrylates, or a combination thereof. Particularly, the barrier layer 236 can include a reaction product of a hard component, a soft component and a cross-linking agent. In some embodiments, the resulting cured barrier layer 236 has a percent elongation of at least about 150%, and in some embodiments, a percent elongation of at least about 200%.

The hard component and/or the soft component of the barrier layer 236 can include functional end groups or functional side chains such that the components can be reacted to form a cross-linked network. In some embodiments, the hard component can include at least one hydroxy functional thermoplastic polyurethane, acrylic polymer, polymeric polyol or mixture thereof and can have a percent elongation of up to about 150%. In some embodiments, the soft component can include at least one hydroxy functional thermoplastic polyurethane, non-reactive polyurethane, polymeric polyol, or mixture thereof and can include a percent elongation of at least about 200%, and particularly, ranging from about 200% to about 800% after cross-linking. In some embodiments, the cross-linking agent is a diisocyanate or a polyisocyanate.

The bonding layer 234, when employed, is chosen such that it does not diminish the flexibility, printability and stain resistance of the barrier layer 236, but rather improves the adhesion between the barrier layer 236 and the body portion 204 or optical layer 206 of the retroreflective article 200. The bonding layer 234 can be formed of a variety of bonding materials, including, but not limited to, a thermally activated bonding material (e.g., thermoplastic polyurethanes), and/or a pressure sensitive adhesive material. Examples of suitable bonding materials include, but are not limited to, acrylics, polyesters, rubbers (e.g., clear rubbers), plasticized polyvinyl chloride, urethane heat-activated materials, or a combination thereof. Examples of suitable urethanes that can be blended for various softening points include, but are not limited to, PERMUTHANE SU-26-248 urethanes, available from Stahl, Peabody, Mass., and DESMOLAC 4340 urethanes available from Bayer, Leverkusen, Germany. The bonding material can include a bonding temperature at which the bonding material would exhibit adhesive properties, or tackiness. In some embodiments, the bonding temperature is greater than room temperature for ease of handling and control.

In some embodiments, the bonding material can also be cured or crosslinked (e.g., after the overlay 202 is coupled to one or more of the underlying layers of the retroreflective article 200). In some embodiments, the bonding material can be thermally cured or crosslinked at an activation temperature that would be higher than the bonding temperature to allow the bonding material to be heated to a first bonding temperature to couple the overlay 202 to the body portion 204 or the optical layer 206, and then heated to a higher temperature (e.g., the activation temperature) to cure the bonding layer 234.

In some embodiments, the barrier layer 236 and/or the bonding layer 234 can include one or more additives to impart properties such as coating uniformity, conspicuity, aesthetics, release properties, outdoor weatherability, or a combination thereof. Examples of suitable additives can include, but are not limited to, surfactants, flow control agents, wetting agents, colorants (e.g., pigments and/or dyes), ultraviolet (UV) stabilizers, hindered amine light stabilizers (HALS), or a combination thereof.

In some embodiments, the barrier layer 236 and/or the bonding layer 234 are coated, transfer laminated, (co-)extruded, or a combination thereof, onto the body portion 204. In some embodiments, the barrier layer 236 and the bonding layer 234 are pre-coated together onto a carrier layer or liner to improve handling and to allow for subsequent storage and lamination to the body portion 204. In some embodiments, the overlay 202 (e.g., comprised of the barrier layer 236 and optional bonding layer 234), is transparent.

In some embodiments, the bonding layer 234 is not provided as a separate layer, but rather is incorporated into the barrier layer 236 by admixing a bonding layer composition, or major component thereof, with the barrier layer composition, for example, such that at least the rear portion of the overlay 202 comprises the bonding material.

The formulations and methods of making such a barrier layer (also sometimes referred to as an "SR layer" for its stain-resistant properties) and a bonding layer are described in greater detail in U.S. Pat. Nos. 6,660,390, 6,723,433, and 6,953,624, the disclosures of which are incorporated herein by reference.

Depending on the desired use of the retroreflective article 200, the barrier layer 236 and the bonding layer 234 can have various properties. For example, in some embodiments, the barrier layer 236 can be rigid, flexible, optically transparent or at least light transmissible, and can have a higher melting point than the bonding layer 234. In some embodiments, the bonding layer 234 can be optically transparent and can have a melt flow point that exceeds the intended in-use temperature requirement of the final retroreflective article 200.

Figure 4:
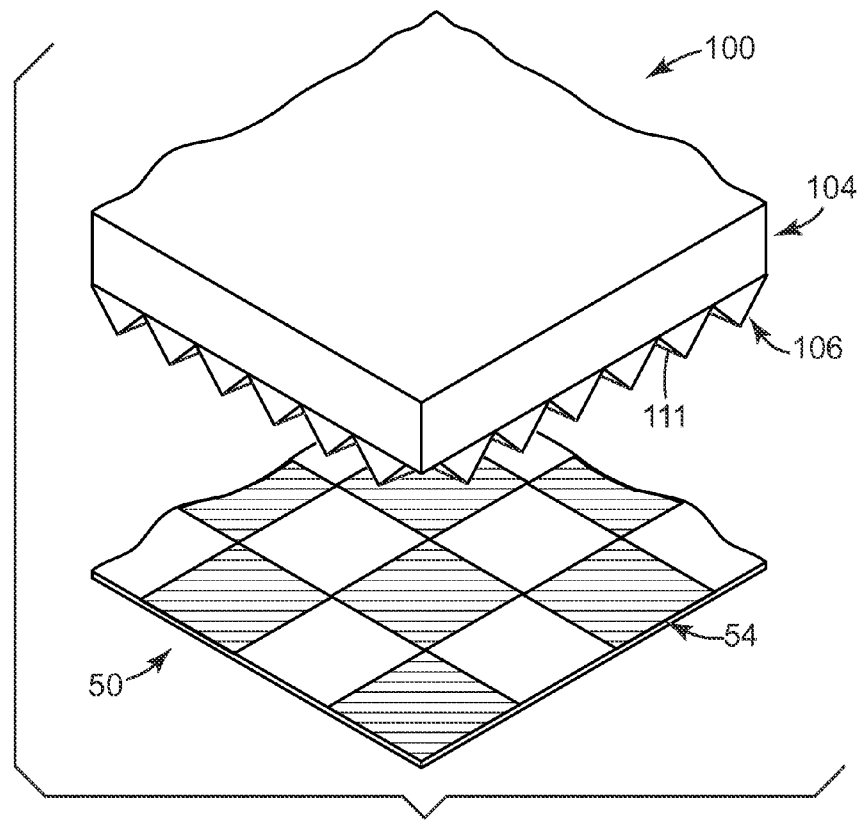
FIG. 4 illustrates a method of making a retroreflective article bearing a graphic according to one embodiment of the present disclosure.

FIG. 4 illustrates a method for making a retroreflective article according to one embodiment of the present disclosure. By way of example only, FIG. 4 illustrates a sublimation method of making the retroreflective article 100 shown in FIGS. 1 and 2. Particularly, FIG. 4 illustrates a method for applying the graphic 114 to the optical layer 106 after the optical layer 106 has already been coupled to the body portion 104.

In general, the sublimation method of applying the graphic 114 (see FIG. 1) to the underside/rear surface 111 of the optical layer 106 involves the use of a graphic donor sheet 50 comprising a donor graphic 54. The donor graphic 54 can include at least one of a color and an image, and in FIG. 4, the donor graphic 54 includes a colorant (e.g., a sublimation dye) in the form of the desired graphic 114 (i.e., a checkered pattern having colored checkers and non-colored spaces between the checkers). In some embodiments, the desired graphic 114 has a certain image where orientation is necessary (e.g., text). In such embodiments, the donor graphic 54 can be formed into the mirror image of the desired graphic 114, such that the resulting graphic 114 has the necessary orientation. When the graphic donor sheet 50 has been formed, it can be used immediately in the sublimation method, or it can be stored (e.g., indefinitely) for later use.

The graphic donor sheet 50 (e.g., comprising the donor graphic 54) can be formed by a variety of methods including printing, coating, dyeing (e.g., solution dyeing), and combinations thereof. The term "printing" is used to refer broadly to a variety of printing methods, including, but not limited to, gravure, offset, flexographic, lithographic, electrostatic, electrographic, electrophotographic (including laser printing and xerography), ion deposition (also referred to as electron beam imaging (EBI)), magnetographics, inkjet printing, dye sublimation printing, screen printing, and combinations thereof. The term "coating" is used to refer broadly to a variety of coating methods, including, but not limited to, vapor coating, notch bar coating, wire bar coating, spray coating, brushing, controlled orifice die coating, and combinations thereof.

The graphic donor sheet base material can be formed of a variety of materials, including, but not limited to, paper, film (e.g., polymeric film, such as polyester film, nylon film, etc., and combinations thereof), fabric, non-wovens, coated paper, coated film, coated fabric, coated non-woven, and combinations thereof. The coating on the coated paper, film, fabric and/or non-woven graphic donor sheets can include release coatings (e.g., silicones or other low energy surfaces), imaging coatings (e.g., coatings for inkjet printing, dielectric and conductive coatings for electrostatic printing, etc.), barrier coatings, non-slip coatings, and combinations thereof. An example of a suitable graphic donor sheet is imaging paper, available under the trade designation "3M™ 8616" from 3M Company, St. Paul, Minn. Another example of a suitable graphic donor sheet is dye sublimation paper, available under the trade designation "TEXPRINT XP PLUS" from Beaver Paper, Atlanta, Ga.

The sublimation method generally includes coupling the graphic donor sheet 50 to the rear surface 111 of the optical layer 106 (e.g., temporarily) to form a composite, and applying one or both of heat and pressure to the composite. The composite can be heated to a temperature of at least the sublimation temperature of the colorant disposed in the graphic donor sheet 50 to sublimate the colorant at least partially from the graphic donor sheet 50 to a receptor sheet, i.e., the rear surface 111 of the optical layer 106. For example, in some embodiments, the composite can be heated to a temperature ranging from about 300° F. to about 350° F.

In some embodiments, the same graphic donor sheet 50 can be used more than once (e.g., on several different optical layers 106 or different portions of the same optical layer 106), until the amount/density of colorant in the graphic donor sheet 50 has been depleted to an unsuitable level.

The method illustrated in FIG. 4 is shown by way of example only, however it should be understood that the graphic 114 (see FIG. 1) can be formed at any point in the process of forming the retroreflective article 100. In some embodiments, the graphic 114 is applied to the rear surface of a completed retroreflective article (e.g., the rear surface 111 of the optical layer 106 of the retroreflective article 100, as shown in FIG. 4). In some embodiments, the graphic 114 is applied to the rear surface of an optical layer (e.g., the rear surface 111 of the optical layer 106) that may or may not be coupled to additional layers (e.g., the body portion 104, and/or additional layers, such as the barrier layer 236 and/or the bonding layer 234 shown in FIG. 3), but which may subsequently be coupled to such additional layers. As a result, the sublimation process illustrated in FIG. 4 can be performed at any step in forming the retroreflective article 100, and need not be performed after the body portion 104 and the optical layer 106 have been fully formed.

In some embodiments, the graphic production process used to form the graphic 114, 214 can include multiple production steps. For example, the process used to produce the graphic 114, 214 can include multiple sublimation steps in order to obtain the desired graphic 114, 214.

The following working examples are intended to be illustrative of the present disclosure and not limiting.

EXAMPLES

Test Methods
  Brightness Measurement
  Brightness was recorded as the Coefficient of Retroreflection ($R_A$), which was measured at 0.2 degree observation angle and −4.0 degree entrance angle according to ASTM E-810:02 test method.
  Color Measurement
  Color was recorded as CIE Color Coordinates, which were obtained using a colorimeter commercially available from Hunter Associate Laboratory Inc., Reston, Va. under the trade designation "Hunterlab ColorFlex." The operating conditions for the "Hunterlab ColorFlex" included a D65 illuminate and a 2 degree observation angle, recording the coordinate for CIE Y, x and y (CIE=Commission Internationale d'Eclairage, the International Commission on Illumination). CIE 1931 Chromaticity Diagram uses cartesian coordinates to define a color in color space. According to CIE 1931 Chromaticity Diagram, the Y, x, and y coordinates plot the luminance, color saturation, and hue, respectively.
  Wash Durability
  The wash durability testing was performed according to the test method ISO 6330-2A (2000). Wash cycles were 12 min. at 60° C. (with rinse and spin cycles as specified in ISO 6330-2A) using WASCATOR® washers (Model FOM71MP, Electrolux Laundry Systems Corporation, Copenhagen, Denmark). Dry cycles were performed every fifth wash cycle for 45 min. at 50° C. using UniDryer dryers (Model UDS-50, UniMac/Alliance Laundry Systems, Ripon, Wis.). The minimum ANSI/ISEA 107-2004 and EN 471 specification at 0 degrees and 90 degrees orientation angles, at a 0.2 degree observation angle and a −4.0 degree entrance angle is 330 cd/lux/m², as measured according to the above Brightness measurement method.

Examples 1-4

Retroreflected Articles Comprising an Optical Layer Bearing a Graphic

In each of Examples 1-4, the graphic was a continuous color, which was applied to the rear surface of the optical layer of a 3M™ SCOTCHLITE™ Retroreflective Series 6260 retroreflective article (available from 3M Company, St. Paul, Minn.). In the 3M™ SCOTCHLITE™ Retroreflective Series 6260 retroreflective article, the body portion is formed of a polyvinyl chloride, and the optical layer is formed of UV-reacted bisphenol A epoxy di-acrylate, trimethylolpropane triacrylate, and 1,6-hexanediol diacrylate.

For Examples 1-4, the following sublimation process was used to obtain the graphic on the underside/rear surface of the optical layer of the retroreflective article:

1. For each of Examples 1-4, the desired graphic (i.e., continuous color) was printed on imaging paper (available under the trade designation "3M™ 8616" from 3M Company, St. Paul, Minn.) using a 3M™ SCOTCHPRINT™ 2000 electrostatic printer (previously available from 3M Company) and 3M™ SCOTCHPRINT™ Dye Sublimation Series 8760/8860 or 8770/8870 transparent dye sublimation toner (i.e., previously available from 3M Company; other sublimation dyes that are designed for use with 3M™ SCOTCHPRINT™ printers are currently available from Hilord Chemical Corporation, Hauppauge, N.Y., including the Hilord SP-2000 Dye Sublimation Electrostatic Digital Inks for 3M's SCOTCHPRINT™ 2000 printer) to form a graphic donor sheet.

The printer voltage settings were adjusted to give a graphic on the imaging paper with approximately the following densities: black, 1.35; yellow, 0.67; cyan, 1.35; magenta, 1.35; as measured with a color reflection densitometer (available under the trade designation "X-RITE 404" from X-rite, Inc., Grand Rapids, Mich.). In Example 1, 3M™ SCOTCHPRINT™ Dye Sublimation Series 8772/8872 transparent magenta dye sublimation toner was used to obtain a "pink" color; in Example 2, 3M™ SCOTCHPRINT™ Dye Sublimation Series 8763/8863 transparent cyan dye sublimation toner and 3M™ SCOTCHPRINT™ Dye Sublimation Series 8772/8872 transparent magenta dye sublimation toner were used to obtain a "blue" color; in Example 3, 3M™ SCOTCHPRINT™ Dye Sublimation Series 8763/8863 transparent cyan dye sublimation toner and 3M™ SCOTCHPRINT™ Dye Sublimation Series 8761/8861 transparent yellow dye sublimation toner were used to obtain a "green" color; and in Example 4, 3M™ SCOTCHPRINT™ Dye Sublimation Series 8772/8872 transparent magenta dye sublimation toner and 3M™ SCOTCHPRINT™ Dye Sublimation Series 8761/8861 transparent yellow dye sublimation toner were used to obtain an "orange" color.

2. A heat press (available under the trade designation "HIX PRESS N-800" from Hix Corporation, Pittsburgh, Kans.) was preheated to 350° F. (177° C.), with air pressure set to 20 psi ($1.4 \times 10^5$ Pa) and timer set to 30 sec.

3. The retroreflective article was sandwiched between silicone paper release liners (available from Mondi Packaging Akrosil LLC, Menasha, Wis.) with the graphic donor sheet to form a composite, where the sublimation dye side of the graphic donor sheet was in contact with the underside/rear surface of the optical layer.

4. The composite from step 3 was then pressed in the heat press described in step 2 at 350° F. (177° C.) and 20 psi ($1.4 \times 10^5$ Pa) for 30 sec. The press was then opened, and the pressed composite was removed from the heat press.

5. The composite was allowed to cool for 2 min. Then, the graphic donor sheet bearing the sublimation dye was removed from the retroreflective article to form a retroreflective article with an optical layer bearing an infused graphic.

The brightness (recorded as Coefficient of Retroreflection ($R_A$; cd/lux/m²) and color (recorded as CIE Color Coordinates) for each of Examples 1-4 were obtained according to the methods described above, the results for which are listed in Tables 1 and 2, respectively. Examples 1-4 were each tested for brightness in duplicates, and averages were calculated for each example. In addition, each of Examples 1-4 was tested for color in duplicates ("Sample 1" and "Sample 2"), and an average for each example was obtained for each CIE color coordinate.

TABLE 1

BRIGHTNESS RESULTS FOR EXAMPLES 1-4, RECORDED AS COEFFICIENT OF RETROREFLECTION ($R_A$; cd/lux/m$^2$)

| BRIGHTNESS | Ex. 1 Pink 100% density | Ex. 2 Blue 100% density | Ex. 3 Green 100% density | Ex. 4 Orange 100% density |
|---|---|---|---|---|
| Sample 1 | 60 | 108 | 257 | 147 |
| Sample 2 | 85.0 | 92.5 | 318 | 143 |
| Average | 72.3 | 100.3 | 287.5 | 145.0 |

TABLE 2

COLOR RESULTS FOR EXAMPLES 1-4, RECORDED AS CIE COLOR COORDINATES

| | COLOR | Ex. 1 Pink 100% density | Ex. 2 Blue 100% density | Ex. 3 Green 100% density | Ex. 4 Orange 100% density |
|---|---|---|---|---|---|
| Sample 1 | color Y | 10.8100 | 10.9300 | 14.4900 | 14.3700 |
| | color x | 0.5204 | 0.1851 | 0.3380 | 0.5554 |
| | color y | 0.2562 | 0.1858 | 0.4249 | 0.3437 |
| Sample 2 | color Y | 13.1100 | 12.2200 | 15.6500 | 14.3700 |
| | color x | 0.5028 | 0.1888 | 0.3406 | 0.5474 |
| | color y | 0.2504 | 0.1971 | 0.4242 | 0.3439 |
| Average | color Y | 11.9600 | 11.5750 | 15.0700 | 14.3700 |
| | color x | 0.5116 | 0.1870 | 0.3393 | 0.5514 |
| | color y | 0.2533 | 0.1915 | 0.4246 | 0.3438 |

Examples 5-7

Retroreflective Articles Comprising a Metalized Optical Layer Bearing a Graphic

In each of Examples 5-7, the graphic was a continuous color, which was applied to the rear surface of the optical layer of a retroreflective article. The retroreflective article used in Examples 5-7 and the Control was a 3M™ SCOTCHLITE™ Retroreflective Series 6260 retroreflective article (available from 3M Company, St. Paul, Minn.). In the 3M™ SCOTCHLITE™ Retroreflective Series 6260 retroreflective article, the body portion is formed of a polyvinyl chloride, and the optical layer is formed of UV-reacted bisphenol A epoxy di-acrylate, trimethylolpropane triacrylate, and 1,6-hexanediol diacrylate. The rear surface of the optical layer 3M™ SCOTCHLITE™ Retroreflective Series 6260 retroreflective article was vapor coated with aluminum (prior to applying the graphic) to form a specularly reflective layer (i.e., a metalized layer) on the rear structured surface of the optical layer.

For each of Examples 5-7, the sublimation process described above with respect to Examples 1-4 was used to obtain the graphic. For Example 5, 3M™ SCOTCHPRINT™ Dye Sublimation Series 8763/8863 transparent cyan dye sublimation toner and 3M™ SCOTCHPRINT™ Dye Sublimation Series 8772/8872 transparent magenta dye sublimation toner were used to obtain a "blue" color. For Example 6, 3M™ SCOTCHPRINT™ Dye Sublimation Series 8763/8863 transparent cyan dye sublimation toner and 3M™ SCOTCHPRINT™ Dye Sublimation Series 8761/8861 transparent yellow dye sublimation toner were used to obtain a "green" color. For Example 7, 3M™ SCOTCHPRINT™ Dye Sublimation Series 8772/8872 transparent magenta dye sublimation toner and 3M™ SCOTCHPRINT™ Dye Sublimation Series 8761/8861 transparent yellow dye sublimation toner were used to obtain an "orange" color.

An embossing layer (i.e., 80 grit aluminum oxide sand paper, available as product number 3461 from 3M Company, St. Paul, Minn.) was coupled to the graphic donor sheet (i.e., to the surface not bearing the sublimation dye) during the sublimation process to impart a sparkle or glitter effect in the resulting retroreflective article, such that the resulting retroreflective article had a sparkle (or glittering) effect. Thus, for each of Examples 5-7, the resulting retroreflective article was metalized, had a sparkle effect, and bore a graphic.

The brightness (recorded as Coefficient of Retroreflection ($R_A$; cd/lux/m$^2$) and color (recorded as CIE Color Coordinates) for the Control and each of Examples 5-7 were obtained according to the methods described above, the results for which are listed in Tables 3 and 4, respectively. Examples 5-7 were each tested in two different positions ("P1" and "P2") for brightness, and averages were calculated for each example. In addition, each of Examples 5-7 was tested for color in two different positions ("P1" and "P2"), and an average for each example was obtained for each CIE color coordinate.

TABLE 3

BRIGHTNESS RESULTS FOR EXAMPLES 5-7, RECORDED AS COEFFICIENT OF RETROREFLECTION ($R_A$; cd/lux/m$^2$)

| BRIGHTNESS | Control | Ex. 5 Blue | Ex. 6 Green | Ex. 7 Orange |
|---|---|---|---|---|
| P1 | 712 | 341 | 617 | 496 |
| P2 | 683 | 430 | 577 | 514 |
| Average | 697.5 | 385.5 | 597.0 | 505.0 |

TABLE 4

COLOR RESULTS FOR EXAMPLES 5-7, RECORDED AS CIE COLOR COORDINATES

| | COLOR | Control | Ex. 5 Blue | Ex. 6 Green | Ex. 7 Orange |
|---|---|---|---|---|---|
| P1 | color Y | 15.1900 | 5.8300 | 77.7700 | 7.4200 |
| | color x | 0.3182 | 0.2131 | 0.3070 | 0.4778 |
| | color y | 0.3379 | 0.2212 | 0.4528 | 0.3660 |
| P2 | color Y | 13.5500 | 5.0200 | 6.9600 | 6.4900 |
| | color x | 0.3199 | 0.2199 | 0.3013 | 0.4868 |
| | color y | 0.3396 | 0.2315 | 0.4529 | 0.3657 |
| Average | color Y | 14.3700 | 5.4250 | 42.3650 | 6.9550 |
| | color x | 0.3191 | 0.2165 | 0.3042 | 0.4823 |
| | color y | 0.3388 | 0.2264 | 0.4529 | 0.3659 |

Examples 8-13

Retroreflected Articles Comprising an Optical Layer Bearing a Graphic Formed by a One-Pass Sublimation Process or a Five-Pass Sublimation Process In each of Examples 8-13, the graphic was a striped pattern, each stripe having a width of 27 mm and a length of 230 mm, each stripe being a different color, in the following order: black, yellow, blue, pink, orange, green, purple. The graphic was applied to the rear surface of the optical layer of a 3M™ SCOTCHLITE™ Retroreflective Series 6260 retroreflective article (described above with respect to Examples 1-4, available from 3M Company).

For Example 8, the sublimation process described above with respect to Examples 1-4 was used to obtain the graphic in a one-pass sublimation process. The graphic that was printed on the imaging paper to form a graphic donor sheet was the mirror image of the desired graphic (i.e., the mirror image of the desired striped pattern). The "black" stripe was formed of 3M™ SCOTCHPRINT™ Dye Sublimation Series 8764/8864 transparent black dye sublimation toner; the "yellow" stripe was formed of 3M™ SCOTCHPRINT™ Dye Sublimation Series 8761/8861 transparent yellow dye sublimation toner; the "blue" stripe was formed of 3M™ SCOTCHPRINT™ Dye Sublimation Series 8763/8863 transparent cyan dye sublimation toner and 3M™ SCOTCHPRINT™ Dye Sublimation Series 8772/8872 transparent magenta dye sublimation toner; the "pink" stripe was formed of 3M™ SCOTCHPRINT™ Dye Sublimation Series 8772/8872 transparent magenta dye sublimation toner; the "orange" stripe was formed of 3M™ SCOTCHPRINT™ Dye Sublimation Series 8772/8872 transparent magenta dye sublimation toner and 3M™ SCOTCHPRINT™ Dye Sublimation Series 8761/8861 transparent yellow dye sublimation toner; the "green" stripe was formed of 3M™ SCOTCHPRINT™ Dye Sublimation Series 8763/886 transparent cyan dye sublimation toner and 3M™ SCOTCHPRINT™ Dye Sublimation Series 8761/8861 transparent yellow dye sublimation toner; and the "purple" stripe was formed of 3M™ SCOTCHPRINT™ Dye Sublimation Series 8763/8863 transparent cyan dye sublimation toner and 3M™ SCOTCHPRINT™ Dye Sublimation Series 8772/8872 transparent magenta dye sublimation toner.

For Examples 9-13, the following five-pass sublimation process was used to obtain the graphic on the underside/rear surface of the optical layer of the retroreflective article:

1. For Examples 9-13, the mirror image of the desired graphic (i.e., striped pattern) was printed onto one imaging paper (available under the trade designation "3M™ 8616" from 3M Company, St. Paul, Minn.) using a 3M™ SCOTCHPRINT™ 2000 electrostatic printer (previously available from 3M Company) and 3M™ SCOTCHPRINT™ Dye Sublimation Series 8760/8860 transparent dye sublimation toner (previously available from 3M Company; other sublimation dyes that are designed for use with 3M™ SCOTCHPRINT™ printers are currently available from Hilord Chemical Corporation, Hauppauge, N.Y., including the Hilord SP-2000 Dye Sublimation Electrostatic Digital Inks for 3M's SCOTCHPRINT™ 2000 printer) to form a graphic donor sheet. The same graphic donor sheet was then used 5 times to form, respectively, Examples 9, 10, 11, 12 and 13. The printer voltage settings and the sublimation dyes used were the same as those described above with respect to Example 8.
2. A heat press (available under the trade designation "HIX PRESS N-800" from Hix Corporation, Pittsburgh, Kans.) was preheated to 300° F. (149° C.), with air pressure set to 20 psi ($1.4 \times 10^5$ Pa) and timer set to 50 sec.
3. The retroreflective article was sandwiched between silicone paper release liners (available from Mondi Packaging Akrosil LLC, Menasha, Wis.) with the graphic donor sheet bearing the mirror image of the graphic to form a composite, where the sublimation dye side of the graphic donor sheet was in contact with the underside/rear surface of the optical layer.
4. The composite from step 3 was then pressed in the heat press described in step 2 at 300° F. (149° C.) and 20 psi ($1.4 \times 10^5$ Pa) for 50 sec. The press was then opened, and the pressed composite was removed from the heat press.
5. The composite was allowed to cool for 2 min. Then, the graphic donor sheet bearing the sublimation dye was removed from the retroreflective article to form Example 9, a retroreflective article with an optical layer bearing the infused striped pattern.
6. Again, the same graphic donor sheet was sandwiched with a second retroreflective article according to step 3 above, and steps 4 and 5 were repeated with the second retroreflective article to form Example 10, a retroreflective article with an optical layer bearing the infused striped pattern.
7. Examples 11, 12 and 13 were then each formed subsequently, following step 6, using the same graphic donor sheet to obtain the infused striped pattern in the optical layer of each retroreflective article.

The brightness (recorded as Coefficient of Retroreflection ($R_A$; cd/lux/m$^2$) for each stripe of the graphic of Examples 8-13 was obtained according to the method described above, the results for which are listed in Table 5. Examples 8-13 were each tested for brightness in two different positions ("P1" and "P2"), and averages were calculated for each example. Table 5 also reports the percent brightness retention (recorded as "% Retained") for each of Examples 9-13, as compared to the initial retroreflective article of Example 8 formed by the one-pass sublimation process.

In addition, each of Examples 8-13 was tested for color (recorded as CIE Color Coordinates) in two different positions ("P1" and "P2") according to the method described above, the results for which are listed in Table 6. Table 6 also reports an average for each CIE color coordinate for each of Examples 8-13. The x,y color shift (x,y shift=SQRT((Color, $Avg_{x,n\text{-}pass}$–Color, $Avg_{x,1\text{-}pass}$)$^2$+(Color, $Avg_{y,n\text{-}pass}$–Color, $Avg_{y,1\text{-}pass}$)$^2$) and Y,x,y color shift (Y,x,y shift=SQRT((Color, $Avg_{x,n\text{-}pass}$–Color, $Avg_{x,1\text{-}pass}$)$^2$+(Color, $Avg_{y,n\text{-}pass}$–Color, $Avg_{y,n\text{-}pass}$)$^2$+(Color, $Avg_{Y,n\text{-}pass}$–Color, $Avg_{Y,1\text{-}pass}$)$^2$) were calculated for each of Examples 9-13, as compared to Example 8 and reported in Table 6.

Because each of Examples 8-13 were formed of a different sample of the retroreflective article, there is some variability from one example to the next in retroreflectivity. Also, some variability in the brightness and/or color could be due to any variability in the hot pressing step from one example to the next.

TABLE 5

BRIGHTNESS RESULTS FOR EXAMPLES 8-13, RECORDED AS COEFFICIENT OF RETROREFLECTION ($R_A$; cd/lux/m$^2$) AND % RETAINED

|  |  | BRIGHTNESS | Black Stripe | Yellow Stripe | Blue Stripe | Pink Stripe | Orange Stripe | Green Stripe | Purple Stripe |
|---|---|---|---|---|---|---|---|---|---|
| Ex. 8 | | P1 | 106 | 989 | 566 | 281 | 325 | 550 | 230 |
| | | P2 | 112 | 1030 | 580 | 302 | 349 | 580 | 241 |
| | | Average | 109.0 | 1009.5 | 573.0 | 291.5 | 337.0 | 565.0 | 235.5 |

TABLE 5-continued

BRIGHTNESS RESULTS FOR EXAMPLES 8-13, RECORDED AS
COEFFICIENT OF RETROREFLECTION ($R_A$; cd/lux/m$^2$) AND % RETAINED

| BRIGHTNESS | | Black Stripe | Yellow Stripe | Blue Stripe | Pink Stripe | Orange Stripe | Green Stripe | Purple Stripe |
|---|---|---|---|---|---|---|---|---|
| Ex. 9 | P1 | 110 | 456 | 360 | 176 | 235 | 392 | 220 |
| | P2 | 115 | 440 | 373 | 183 | 226 | 369 | 195 |
| | Average | 112.5 | 448.0 | 366.5 | 179.5 | 230.5 | 380.5 | 207.5 |
| | % Retained | 103.2% | 44.4% | 64.0% | 61.6% | 68.4% | 67.3% | 88.1% |
| Ex. 10 | P1 | 109 | 384 | 409 | 200 | 271 | 416 | 250 |
| | P2 | 112 | 403 | 371 | 166 | 238 | 387 | 225 |
| | Average | 110.5 | 393.5 | 390.0 | 183.0 | 254.5 | 401.5 | 237.5 |
| | % Retained | 101.4% | 39.0% | 68.1% | 62.8% | 75.5% | 71.1% | 100.8% |
| Ex. 11 | P1 | 86 | 420 | 387 | 196 | 271 | 419 | 243 |
| | P2 | 107 | 415 | 388 | 182 | 237 | 378 | 219 |
| | Average | 96.5 | 417.5 | 387.5 | 189.0 | 254.0 | 398.5 | 231.0 |
| | % Retained | 88.5% | 41.4% | 67.6% | 64.8% | 75.4% | 70.5% | 98.1% |
| Ex. 12 | P1 | 84 | 420 | 383 | 183 | 242 | 344 | 206 |
| | P2 | 101 | 432 | 373 | 196 | 239 | 380 | 231 |
| | Average | 92.5 | 426.0 | 378.0 | 189.5 | 240.5 | 362.0 | 218.5 |
| | % Retained | 84.9% | 42.2% | 66.0% | 65.0% | 71.4% | 64.1% | 92.8% |
| Ex. 13 | P1 | 94 | 442 | 409 | 207 | 255 | 375 | 205 |
| | P2 | 78 | 362 | 352 | 166 | 220 | 331 | 197 |
| | Average | 86.0 | 402.0 | 380.5 | 186.5 | 237.5 | 353.0 | 201.0 |
| | % Retained | 78.9% | 39.8% | 66.4% | 64.0% | 70.5% | 62.5% | 85.4% |

TABLE 6

COLOR RESULTS FOR EXAMPLES 8-13, RECORDED AS CIE COLOR
COORDINATES AND COLOR SHIFTS

| COLOR | | | Black Stripe | Yellow Stripe | Blue Stripe | Pink Stripe | Orange Stripe | Green Stripe | Purple Stripe |
|---|---|---|---|---|---|---|---|---|---|
| Ex. 8 | P1 | Y | 2.0500 | 39.2700 | 11.8300 | 9.0700 | 10.5200 | 13.1200 | 3.5200 |
| | | x | 0.3568 | 0.4044 | 0.1942 | 0.5129 | 0.5892 | 0.2579 | 0.2742 |
| | | y | 0.3082 | 0.4722 | 0.2120 | 0.2518 | 0.3283 | 0.4471 | 0.1637 |
| | P2 | Y | 2.1000 | 39.2100 | 11.2700 | 9.2100 | 10.6600 | 13.4300 | 3.5100 |
| | | x | 0.3554 | 0.4032 | 0.1935 | 0.5108 | 0.5865 | 0.2586 | 0.2710 |
| | | y | 0.3080 | 0.4739 | 0.2084 | 0.2509 | 0.3287 | 0.4503 | 0.1620 |
| | Avg | Y | 2.0750 | 39.2400 | 11.5500 | 9.1400 | 10.5900 | 13.2750 | 3.5150 |
| | | x | 0.3561 | 0.4038 | 0.1939 | 0.5119 | 0.5879 | 0.2583 | 0.2726 |
| | | y | 0.3081 | 0.4731 | 0.2102 | 0.2514 | 0.3285 | 0.4487 | 0.1629 |
| Ex. 9 | P1 | Y | 3.5300 | 36.6800 | 18.3200 | 9.8200 | 11.3700 | 20.4400 | 6.4900 |
| | | x | 0.3478 | 0.3812 | 0.2414 | 0.4874 | 0.5547 | 0.2993 | 0.3227 |
| | | y | 0.3124 | 0.4468 | 0.2649 | 0.2459 | 0.3268 | 0.4213 | 0.1981 |
| | P2 | Y | 3.4800 | 36.4300 | 17.9000 | 10.0800 | 11.0600 | 20.2300 | 5.7300 |
| | | x | 0.3501 | 0.3867 | 0.2401 | 0.4833 | 0.5590 | 0.2935 | 0.3150 |
| | | y | 0.3129 | 0.4465 | 0.2657 | 0.2453 | 0.3269 | 0.4256 | 0.1887 |
| | Avg | Y | 3.5050 | 36.5550 | 18.1100 | 9.9500 | 11.2150 | 20.3350 | 6.1100 |
| | | x | 0.3490 | 0.3840 | 0.2408 | 0.4854 | 0.5569 | 0.2964 | 0.3189 |
| | | y | 0.3127 | 0.4467 | 0.2653 | 0.2456 | 0.3269 | 0.4235 | 0.1934 |
| | x, y shift | | 0.0085 | 0.0330 | 0.0724 | 0.0271 | 0.0310 | 0.0457 | 0.0554 |
| | Y, x, y shift | | 1.4300 | 2.6852 | 6.5604 | 0.8105 | 0.6258 | 7.0601 | 2.5956 |
| Ex. 10 | P1 | Y | 4.1700 | 38.1200 | 21.1100 | 11.2900 | 14.6500 | 25.7300 | 6.7800 |
| | | x | 0.3336 | 0.3734 | 0.2421 | 0.4688 | 0.5236 | 0.3112 | 0.3097 |
| | | y | 0.3147 | 0.4390 | 0.2738 | 0.2457 | 0.3464 | 0.4608 | 0.1974 |
| | P2 | Y | 3.7000 | 39.3500 | 21.1500 | 11.4900 | 14.4900 | 24.0200 | 7.8900 |
| | | x | 0.3401 | 0.3765 | 0.2435 | 0.4709 | 0.5137 | 0.3030 | 0.3108 |
| | | y | 0.3162 | 0.4434 | 0.2770 | 0.2478 | 0.3380 | 0.4174 | 0.2047 |
| | Avg | Y | 3.9350 | 38.7350 | 21.1300 | 11.3900 | 14.5700 | 24.8750 | 7.3350 |
| | | x | 0.3369 | 0.3750 | 0.2428 | 0.4699 | 0.5187 | 0.3071 | 0.3103 |
| | | y | 0.3155 | 0.4412 | 0.2754 | 0.2468 | 0.3422 | 0.4391 | 0.2011 |
| | x, y shift | | 0.0206 | 0.0430 | 0.0815 | 0.0423 | 0.0705 | 0.0498 | 0.0536 |
| | Y, x, y shift | | 1.8601 | 0.5068 | 9.5803 | 2.2504 | 3.9806 | 11.6001 | 3.8204 |
| Ex. 11 | P1 | Y | 3.2000 | 37.9500 | 17.5600 | 11.9400 | 14.7400 | 22.9900 | 7.3600 |
| | | x | 0.3328 | 0.3780 | 0.2421 | 0.4644 | 0.5109 | 0.3025 | 0.3013 |
| | | y | 0.3138 | 0.4466 | 0.2573 | 0.2477 | 0.3425 | 0.4151 | 0.1988 |
| | P2 | Y | 3.6600 | 36.7300 | 17.2800 | 11.9200 | 15.1000 | 22.8500 | 7.6900 |
| | | x | 0.3320 | 0.3751 | 0.2424 | 0.4653 | 0.5072 | 0.3010 | 0.3010 |
| | | y | 0.3167 | 0.4437 | 0.2565 | 0.2481 | 0.3428 | 0.4187 | 0.2005 |
| | Avg | Y | 3.4300 | 37.3400 | 17.4200 | 11.9300 | 14.9200 | 22.9200 | 7.5250 |
| | | x | 0.3324 | 0.3766 | 0.2423 | 0.4649 | 0.5091 | 0.3018 | 0.3012 |
| | | y | 0.3153 | 0.4452 | 0.2569 | 0.2479 | 0.3427 | 0.4169 | 0.1997 |
| | x, y shift | | 0.0248 | 0.0390 | 0.0673 | 0.0471 | 0.0801 | 0.0539 | 0.0466 |
| | Y, x, y shift | | 1.3552 | 1.9004 | 5.8704 | 2.7904 | 4.3307 | 9.6452 | 4.0103 |

TABLE 6-continued

COLOR RESULTS FOR EXAMPLES 8-13, RECORDED AS CIE COLOR COORDINATES AND COLOR SHIFTS

| | COLOR | | Black Stripe | Yellow Stripe | Blue Stripe | Pink Stripe | Orange Stripe | Green Stripe | Purple Stripe |
|---|---|---|---|---|---|---|---|---|---|
| Ex. 12 | P1 | Y | 3.2000 | 36.9900 | 17.6700 | 12.8600 | 16.8900 | 22.8400 | 7.2000 |
| | | x | 0.3296 | 0.3754 | 0.2355 | 0.4532 | 0.4864 | 0.2989 | 0.2891 |
| | | y | 0.3137 | 0.4468 | 0.2593 | 0.2501 | 0.3479 | 0.4184 | 0.1955 |
| | P2 | Y | 3.6400 | 37.4300 | 17.9600 | 13.3600 | 17.0700 | 22.2500 | 8.0800 |
| | | x | 0.3269 | 0.3749 | 0.2341 | 0.4471 | 0.4946 | 0.2976 | 0.2895 |
| | | y | 0.3151 | 0.4472 | 0.2588 | 0.2499 | 0.3481 | 0.4225 | 0.2014 |
| | Avg | Y | 3.4200 | 37.2100 | 17.8150 | 13.1100 | 16.9800 | 22.5450 | 7.6400 |
| | | x | 0.3283 | 0.3752 | 0.2348 | 0.4502 | 0.4905 | 0.2983 | 0.2893 |
| | | y | 0.3144 | 0.4470 | 0.2591 | 0.2500 | 0.3480 | 0.4205 | 0.1985 |
| | x, y shift | | 0.0286 | 0.0387 | 0.0637 | 0.0617 | 0.0993 | 0.0490 | 0.0393 |
| | Y, x, y shift | | 1.3453 | 2.0304 | 6.2653 | 3.9705 | 6.3908 | 9.2701 | 4.1252 |
| Ex. 13 | P1 | Y | 3.1400 | 32.2600 | 16.5200 | 11.9400 | 15.7500 | 20.4300 | 7.1700 |
| | | x | 0.3447 | 0.3836 | 0.2449 | 0.4539 | 0.4945 | 0.3141 | 0.3040 |
| | | y | 0.3050 | 0.4303 | 0.2588 | 0.2508 | 0.3394 | 0.4028 | 0.2015 |
| | P2 | Y | 3.5600 | 31.9100 | 16.4900 | 12.3400 | 15.7300 | 20.1000 | 7.4700 |
| | | x | 0.3384 | 0.3834 | 0.2411 | 0.4566 | 0.5001 | 0.3129 | 0.3048 |
| | | y | 0.3083 | 0.4305 | 0.2546 | 0.2526 | 0.3398 | 0.4022 | 0.2001 |
| | Avg | Y | 3.3500 | 32.0850 | 16.5050 | 12.1400 | 15.7400 | 20.2650 | 7.3200 |
| | | x | 0.3416 | 0.3835 | 0.2430 | 0.4553 | 0.4973 | 0.3135 | 0.3044 |
| | | y | 0.3067 | 0.4304 | 0.2567 | 0.2517 | 0.3396 | 0.4025 | 0.2008 |
| | x, y shift | | 0.0146 | 0.0472 | 0.0677 | 0.0566 | 0.0912 | 0.0720 | 0.0495 |
| | Y, x, y shift | | 1.2751 | 7.1552 | 4.9555 | 3.0005 | 5.1508 | 6.9904 | 3.8053 |

Example 11

Launderability Testing of a Retroreflective Article Comprising an Optical Layer Bearing a Graphic In Example 11, the graphic was a checkered pattern consisting of alternating cyan checkers. That is, the cyan checkers formed the imaged portions of the graphic, and spaces between the cyan checkers formed the non-imaged portions of the graphic. Specifically, the graphic used in Example 11 was similar to that of FIGS. 1 and 4 and included 0.75" (1.9 cm)×0.75" (1.9 cm) squares in a checkerboard pattern with alternating colored (i.e., cyan) and non-colored squares, such that the non-colored squares would maintain the color of the layer onto which the graphic was applied. The center-to-center side-by-side distance between colored squares (i.e., the center-to-center distance between alternating colored squares) was 2" (5 cm). Each sample was formed by applying the graphic to the underside/rear surface of the optical layer of a 3M™ SCOTCHLITE™ Retroreflective Series 6260 retroreflective article (described above with respect to Examples 1-4, available from 3M Company), and cutting a strip of the resulting retroreflective article having dimensions of 2" (5 cm)×8" (20 cm), with the checkered pattern centered on the 2-inch strip.

The sublimation process described above with respect to Examples 1-4 was used to apply the graphic to the optical layer in Example 11, using 3M™ SCOTCHPRINT™ Dye Sublimation Series 8763/8863 transparent cyan dye sublimation toner.

Example 11 was tested for brightness before and after 50 wash cycles (i.e., after 50 wash cycles of 5:1 wash:dry, according to the above-described wash durability test method), the results for which are shown in Table 7, recorded as Coefficient of Retroreflection ($R_A$; cd/lux/m$^2$) and percent brightness retention ("% Retained"). Example 11 was tested in two different positions (i.e., "P1" and "P2") on the strip, and an average was calculated.

In addition, Example 11 was tested for color before and after 50 wash cycles, the results for which are shown in Table 8, recorded as CIE Color Coordinates and Color Shifts. Example 11 was tested for color in two different positions ("P1" and "P2"). An average was obtained for each CIE color coordinate (i.e., x, y, and Y), and the x,y color shift (x,y shift=SQRT((Cyan, Avg$_{x,After}$–Cyan, Avg$_{x,Before}$)$^2$+(Cyan, Avg$_{y,After}$–Cyan, Avg$_{y,Before}$)$^2$) and Y,x,y color shift (Y,x,y shift=SQRT((Cyan, Avg$_{x,After}$–Cyan, Avg$_{x,Before}$)$^2$+(Cyan, Avg$_{y,After}$–Cyan, Avg$_{y,Before}$)$^2$+(Cyan, Avg$_{Y,After}$–Cyan, Avg$_{Y,Before}$)$^2$) were calculated.

Example 11 was also visually observed for overall appearance after 15 wash cycles (i.e., 15 wash cycles and 3 dry cycles) and after 50 wash cycles, the results for which are shown in Table 9.

TABLE 7

BRIGHTNESS RESULTS BEFORE AND AFTER 50 WASH CYCLES FOR EXAMPLE 11, RECORDED AS COEFFICIENT OF RETROREFLECTION ($R_A$; cd/lux/m$^2$) AND % RETAINED

| BRIGHTNESS | | Ex. 11 |
|---|---|---|
| Before wash, Non-colored | P1 | 1050 |
| | P2 | 1140 |
| | Average | 1095.0 |
| Before wash, Cyan | P1 | 345 |
| | P2 | 336 |
| | Average | 340.5 |
| After wash, Non-colored | P1 | 617 |
| | P2 | 618 |
| | Average | 617.5 |
| | % Retained | 56.4% |
| After wash, Cyan | P1 | 362 |
| | P2 | 429 |
| | Average | 395.5 |
| | % Retained | 116.2% |

TABLE 8

COLOR RESULTS BEFORE AND AFTER 50 WASH CYCLES FOR EXAMPLE 11, RECORDED AS CIE COLOR COORDINATES AND COLOR SHIFTS

| COLOR | | Ex. 11 |
|---|---|---|
| Before wash, Cyan, P1 | color Y | 7.2800 |
|  | color x | 0.2180 |
|  | color y | 0.2346 |
| Before wash, Cyan, P2 | color Y | 7.9100 |
|  | color x | 0.2184 |
|  | color y | 0.2389 |
| Before wash, Cyan, Avg | color Y | 7.5950 |
|  | color x | 0.2182 |
|  | color y | 0.2368 |
| After wash, Cyan, P1 | color Y | 9.54 |
|  | color x | 0.2286 |
|  | color y | 0.2571 |
| After wash, Cyan, P2 | color Y | 9.5 |
|  | color x | 0.2267 |
|  | color y | 0.2537 |
| After wash, Cyan, Avg | color Y | 9.5200 |
|  | color x | 0.2277 |
|  | color y | 0.2554 |
| Color Change | x, y shift | 0.0209 |
| Color Change | Y, x, y shift | 1.9251 |

TABLE 9

VISUAL OBSERVATIONS OF EXAMPLE 11 AFTER 15 WASH CYCLES AND AFTER 50 WASH CYCLES

| OBSERVATIONS | Ex. 11 |
|---|---|
| 15 WASH CYCLES | Intact |
| 50 WASH CYCLES | Intact |

The embodiments described above and illustrated in the figures are presented by way of example only and are not intended as a limitation upon the concepts and principles of the present disclosure. As such, it will be appreciated by one having ordinary skill in the art that various changes in the elements and their configuration and arrangement are possible without departing from the spirit and scope of the present disclosure. Various features and aspects of the present disclosure are set forth in the following claims.

What is claimed is:

1. A prismatic retroreflective article bearing a graphic comprising:
   an optical layer comprising internally reflecting cube-corner optical elements, the optical layer having a front surface and a rear structured surface opposite the front surface, the rear structured surface defined at least partially by the cube-corner optical elements,
   the rear structured surface being infused with a graphic, such that the prismatic retroreflective article retroreflects the graphic when viewed from the front surface of the optical layer.

2. The prismatic retroreflective article of claim 1, further comprising a transparent polymeric body portion having a front surface and a rear surface opposite the front surface, the rear surface coupled to the front surface of the optical layer.

3. The prismatic retroreflective article of claim 1, wherein the infused graphic includes a sublimation dye.

4. The prismatic retroreflective article of claim 3, wherein the sublimation dye includes at least one of an azo dye, an anthraquinone dye, a quinoline dye, and a combination thereof.

5. The prismatic retroreflective article of claim 1, wherein the rear structured surface includes a specularly reflective material.

6. The prismatic retroreflective article of claim 5, wherein at least a portion of the infused graphic is positioned in front of the specularly reflective material.

7. The prismatic retroreflective article of claim 1, further comprising an overlay coupled to the front surface of the body portion.

8. The prismatic retroreflective article of claim 6, wherein the overlay comprises a barrier layer and a bonding layer, such that the bonding layer of the overlay is coupled to the front surface of the optical layer.

9. The prismatic retroreflective article of claim 1, wherein the cube-corner optical elements are at least partially distorted to give the retroreflective article a glittering effect.

10. The prismatic retroreflective article of claim 1, wherein the graphic includes an image.

11. A method of making a prismatic retroreflective article bearing a graphic, the method comprising:
    providing a graphic donor sheet comprising a first surface comprising a sublimation colorant;
    providing a prismatic retroreflective article comprising an optical layer comprising a rear structured surface at least partially defined by internally-reflecting cube-corner optical elements;
    coupling the graphic donor sheet to the prismatic retroreflective article to form a composite, such that the first surface of the graphic donor sheet is coupled to the rear structured surface of the optical layer; and
    applying heat and pressure to the composite to transfer at least a portion of the sublimation colorant from the graphic donor sheet to the rear structured surface of the optical layer, such that the optical layer is infused with a graphic.

12. The method of claim 11, further comprising removing the graphic donor sheet from the prismatic retroreflective article.

13. The method of claim 11, wherein the graphic is buried with respect to a front surface of the prismatic retroreflective article.

14. The method of claim 11, wherein the graphic donor sheet comprising the sublimation colorant is formed by at least one of gravure printing, offset printing, flexographic printing, lithographic printing, electrostatic printing, electrographic printing, electrophotographic printing, ion deposition printing, magnetographic printing, inkjet printing, dye sublimation printing, screen printing, coating, solution dyeing, and a combination thereof.

15. The method of claim 11, wherein the sublimation colorant of the graphic donor sheet is in the form an image on the graphic donor sheet, and wherein the image is a mirror image of the graphic.

16. The method of claim 11, wherein the sublimation colorant includes a sublimation dye that includes at least one of an azo dye, an anthraquinone dye, a quinoline dye, and a combination thereof.

17. The method of claim 11, wherein the prismatic retroreflective article is a first prismatic retroreflective article, and further comprising:
    providing a second prismatic retroreflective article comprising an optical layer comprising a rear structured surface at least partially defined by internally-reflecting cube-corner optical elements;
    coupling the graphic donor sheet to the second prismatic retroreflective article to form a second composite, such that the first surface of the graphic donor sheet is coupled to the rear structured surface of the optical layer; and applying heat and pressure to the second composite to transfer at least a portion of the sublimation colorant from the graphic donor sheet to the rear structured surface of the optical layer, such that the optical layer is infused with a graphic.

18. The method of claim 17, further comprising removing the graphic donor sheet from the second prismatic retroreflective article.

19. The method of claim 11, wherein providing a prismatic retroreflective article includes providing a prismatic retroreflective article comprising an optical layer that includes a rear structured surface that includes a specularly reflective material, wherein coupling the graphic donor sheet to the prismatic retroreflective article includes coupling the graphic donor sheet to the prismatic retroreflective article to form a composite, such that first surface of the graphic donor sheet is coupled to the rear structured surface that includes a specularly reflective material.

20. The method of claim 19, wherein at least a portion of the infused graphic is positioned in front of the specularly reflective material.

21. The method of claim 11, further comprising applying a specularly reflective layer to the rear structured surface of the optical layer of the prismatic retroreflective article.

22. The method of claim 21, wherein applying a specularly reflective layer to the rear structured surface of the optical layer includes applying a specularly reflective layer to the rear structured surface of the optical layer after applying heat and pressure to the composite.

\* \* \* \* \*